(12) United States Patent
Yang et al.

(10) Patent No.: US 10,600,594 B2
(45) Date of Patent: Mar. 24, 2020

(54) GAS-INSULATED VACUUM LOAD BREAK SWITCH

(71) Applicant: ABB Schweiz AG, Baden (CH)

(72) Inventors: Huihuang Yang, Fujian (CN); Hongyong Wang, Beijing (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/132,595

(22) Filed: Sep. 17, 2018

(65) Prior Publication Data

US 2019/0027328 A1  Jan. 24, 2019

Related U.S. Application Data

(63) Continuation of application No. PCT/CN2016/082323, filed on May 17, 2016.

(51) Int. Cl.
*H01H 33/666* (2006.01)
*H01H 31/00* (2006.01)
(Continued)

(52) U.S. Cl.
CPC .......... *H01H 33/6661* (2013.01); *H01H 9/26* (2013.01); *H01H 31/003* (2013.01);
(Continued)

(58) Field of Classification Search
CPC . H02B 13/0352–0354; H01H 33/6661; H01H 33/121; H01H 33/66; H01H 9/26; H01H 31/003
(Continued)

(56) References Cited

U.S. PATENT DOCUMENTS

| 8,779,318 B2 * | 7/2014 | Espeseth .................. H01H 3/02 218/124 |
| 2010/0006544 A1 | 1/2010 | Onufriyenko et al. |
| 2014/0104758 A1 * | 4/2014 | Bjortuft ............... H01H 31/003 361/605 |

FOREIGN PATENT DOCUMENTS

| CN | 101017739 A | 8/2007 |
| CN | 101847839 A | 9/2010 |

(Continued)

OTHER PUBLICATIONS

International Search Report and Written Opinion, International Patent Application No. PCT/CN2016/082323, dated Feb. 23, 2017, 13 pages including English translation.
(Continued)

*Primary Examiner* — Zachary Pape
(74) *Attorney, Agent, or Firm* — Taft Stettinius & Hollister LLP; J. Bruce Schelkopf (57) ABSTRACT

The present disclosure provides a gas-insulated vacuum load break switch, including a high-voltage conductive loop having three phases independent from each other and of the same design, a control operating mechanism, a support box and a transmission apparatus. Each phase of the high-voltage conductive loop includes a load break switch unit with a vacuum interrupter, an isolating switch unit with an isolator, a plastic housing supporting the load break switch unit and the isolating switch unit, and an earthing switch unit; the control operating mechanism includes an operating mechanism for controlling the load break switch unit, an operating rod for controlling the isolating switch unit, and an operating mechanism for controlling the earthing switch unit.

8 Claims, 5 Drawing Sheets

(51) Int. Cl.
　　　*H01H 33/12*　　　(2006.01)
　　　*H02B 13/035*　　(2006.01)
　　　*H01H 9/26*　　　(2006.01)
(52) U.S. Cl.
　　　CPC ........ *H01H 33/121* (2013.01); *H01H 33/666*
　　　　　　(2013.01); *H02B 13/0354* (2013.01); *H02B*
　　　　　　　　　　　　　　　　　　　*13/0352* (2013.01)
(58) Field of Classification Search
　　　USPC ........................................ 361/604, 612, 618
　　　See application file for complete search history.

(56) References Cited

FOREIGN PATENT DOCUMENTS

| | | |
|---|---|---|
| CN | 201667314 U | 12/2010 |
| DE | 19857170 B4 | 7/2009 |
| EP | 2667395 A1 | 11/2013 |
| RU | 44206 U1 | 2/2005 |
| RU | 2439737 C2 | 10/2012 |
| RU | 135446 U1 | 12/2013 |
| RU | 2584144 C2 | 5/2016 |

OTHER PUBLICATIONS

Russian Search Report, Russian Patent Application No. 2018132437/07, dated May 15, 2019, 4 pages including English translation.
Chinese Office Action, Chinese Patent Application No. 201680081291.9, dated Mar. 5, 2019, 10 pages including English translation.
Chinese Search Report, Chinese Patent Application No. 201680081291.9, dated Mar. 5, 2019, 4 pages including English translation.

\* cited by examiner

GAS-INSULATED VACUUM LOAD BREAK SWITCH

FIELD

The present disclosure relates to electrical products and mechanical technology, and more specifically, to a medium-voltage gas-insulated vacuum load switch.

BACKGROUND

In power distribution network, especially in a rural power distribution network of China, load break switch (LBS) are widely applied in secondary ring main units, wherein about 50% of the load break switches are sulfur hexafluoride (SF$_6$) load break switch with advantages of reliable insulation and small device size. However, the sulfur hexafluoride load break switches are not environmentally friendly. The other 25% of load break switch are vacuum load break switch with the advantages of reliable insulation and being environmentally friendly but having a large device size.

In the prior art, owing to the powerful making and breaking capability and insulating performance of SF$_6$, SF$_6$ load break switch with sulfur hexafluoride as insulating medium can be very compact in terms of product size and can well meet the spatial requirement of secondary ring main units. However, with people's growing awareness of importance of environment protection, sulfur hexafluoride load switch has been gradually phased out because of the defect that its insulating medium is not environmentally friendly. Approximately 1% of sulfur hexafluoride load break switch are replaced by vacuum load break switch each year. However, although the vacuum load break switches in the prior art take vacuum as breaking medium, the majority of the live parts are still completely exposed in the air. In order to achieve the purpose of reliable insulation, the product size must be large enough, resulting in a waste of space to a large extent.

In order to make best use of the advantages and avoid the disadvantages, there is provided a new solution for vacuum load switch.

SUMMARY

With regard to the problem existing in the current gas-insulated vacuum load switch, the present disclosure provides a gas-insulated vacuum load break switch, comprising a high-voltage conductive loop, a control operating mechanism, a support box and a transmission apparatus, wherein the high-voltage conductive loop has three phases, all three phases of the high-voltage conductive loop are of a same structure and independent from each other. Each phase of the high-voltage conductive loop has a load break switch unit with a vacuum interrupter, an isolating switch unit with an isolator, a plastic housing supporting the load break switch unit and the isolating switch unit, and an earthing switch unit; the control operating mechanism comprises a load break switch operating mechanism for controlling the load break switch unit, an operating rod for controlling the isolating switch unit, and an earthing switch operating mechanism for controlling the earthing switch unit; and the transmission apparatus comprises a load break switch transmission apparatus for the load break switch unit, an isolating switch transmission apparatus for the isolating switch unit and an earthing switch transmission apparatus for the earthing switch unit.

In accordance with a preferred embodiment of the present disclosure, the isolating switch unit comprises a busbar connection terminal, an isolator assembly, an isolator driving connection rod integrating transmission apparatus and insulation, a driving crank arm of the isolator, a driving spindle of the isolating switch and a connection terminal of the load break switch and the isolating switch.

In accordance with a preferred embodiment of the present disclosure, the isolator assembly disengages from the busbar connection terminal and forms an isolating gap when in a horizontal position, and the isolator driving connection rod integrating transmission and insulation is used for insulation and reduces a distance between a high-voltage side and a low-voltage side.

In accordance with a preferred embodiment of the present disclosure, the isolator assembly connects the busbar connection terminal and the connection terminal of the load break switch and the isolating switch when in a vertical position, the isolator driving connection rod integrating transmission and insulation is used for fixing the isolator assembly and at the same time the isolating switch unit is in a close state.

In accordance with a preferred embodiment of the present disclosure, the load break switch unit and the isolating switch unit are fixed through a plastic support housing and electrical connection between conductive components of the load break switch unit and the isolating switch unit is achieved by means of a metal insert poured inside the plastic support housing.

In accordance with a preferred embodiment of the present disclosure, the plastic support housing is provided with rib features in different directions to increase a creepage distance between charged objects and enhance mechanical strength of the plastic support housing.

In accordance with a preferred embodiment of the present disclosure, the plastic support housing is further provided with an isolating gap observation window and an earthing fracture observation window.

In accordance with a preferred embodiment of the present disclosure, the load break switch unit comprises a vacuum interrupter, a flexible band, a push-rod assembly, a push-rod driving crank arm, a load break switch driving spindle and a cable connection terminal.

In accordance with a preferred embodiment of the present disclosure, the load break switch driving spindle is an insulator.

In accordance with a preferred embodiment of the present disclosure, the load break switch unit further comprises a silicone sleeve cladded on the load break switch driving spindle for increasing a creepage distance between phases.

In accordance with a preferred embodiment of the present disclosure, the earthing switch unit comprises an earthing switch stationary contact and an earthing switch body, and the earthing switch stationary contact is connected with the cable connection terminal poured inside the plastic support housing which is mounted on a support box to fix the overall high-voltage conductive loop.

In accordance with a preferred embodiment of the present disclosure, the earthing switch unit is located at a left side of the load break switch unit.

BRIEF DESCRIPTION OF THE DRAWINGS

FIGS. 1A-1B are structural schematic diagrams of a gas-insulated vacuum load break switch of the present disclosure, in which

FIGS. 2A-2C are schematic diagrams of the gas-insulated vacuum load break switch of the present disclosure under different states, in which

FIGS. 3A-3C are sectional schematic diagrams of a single-phase high-voltage conductive loop when the gas-insulated vacuum load break switch of the present disclosure is under different states, in which

FIGS. 4A-4C are single line diagrams when the gas-insulated vacuum load break switch of the present disclosure is used as outgoing cabinet, in which

FIGS. 5A-5D are schematic diagrams of constituting structure of a load break switch unit, an isolating switch unit and an earthing switch unit of a three-phase high-voltage conductive loop when the gas-insulated vacuum load break switch of the present disclosure is used as outgoing cabinet, in which

FIGS. 6A-6B are single line diagrams when the gas-insulated vacuum load break switch of the present disclosure is used as incoming cabinet, in which

FIGS. 7A-7C are schematic diagrams of constituting structure of a load break switch unit and an isolating switch unit of a three-phase high-voltage conductive loop when the gas-insulated vacuum load break switch of the present disclosure is used as incoming cabinet, in which

DETAILED DESCRIPTION OF EMBODIMENTS

Reference will be made to the drawings to describe optional embodiments of the present disclosure in detail.

Working principles of the present disclosure will be described in greater detail with reference to drawings of the present disclosure. Functions and working principles of the high-voltage conductive loop will be described below in combination with single line diagrams of the present disclosure under different application scenarios.

Figure 1A:
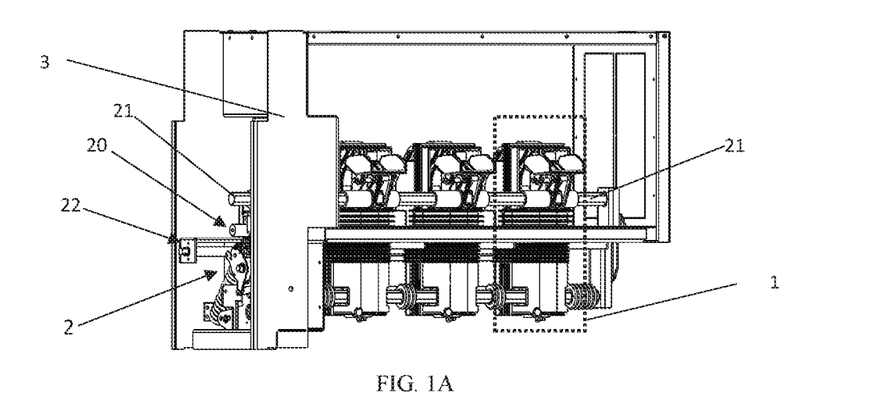
FIG. 1A is a schematic diagram of an overall structure.
Figure 1B:
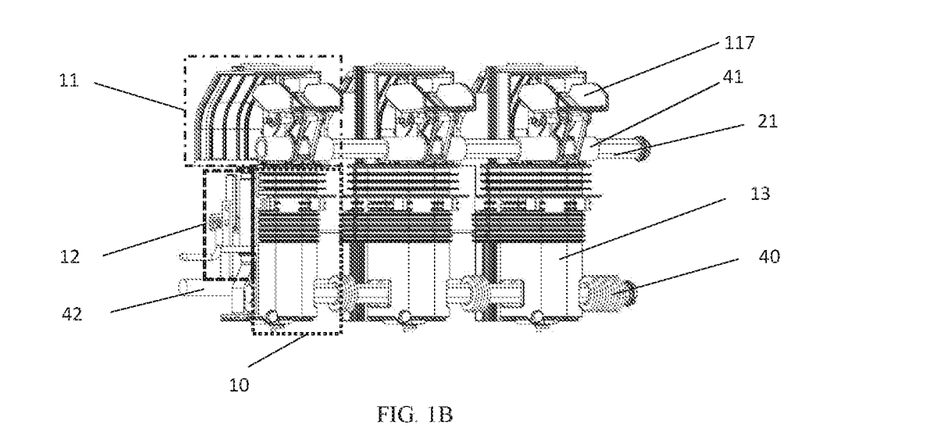
FIG. 1B is a structural schematic diagram of a high-voltage conductive loop part.
Figure 2A:
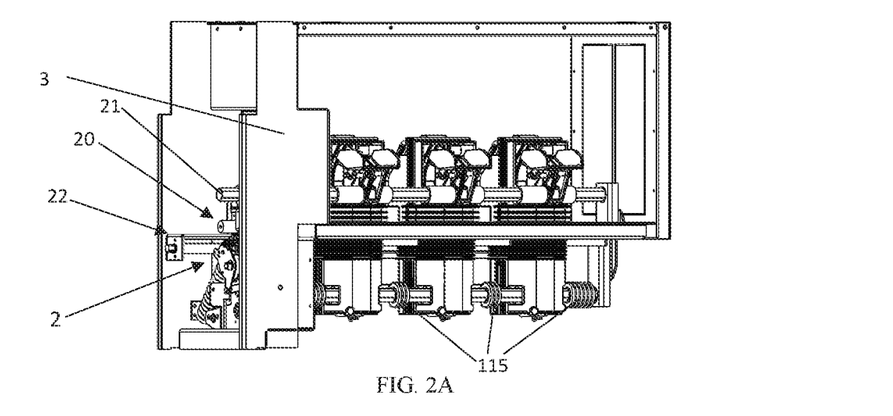
FIG. 2A is a schematic diagram of a switch in a close state.
Figure 2B:
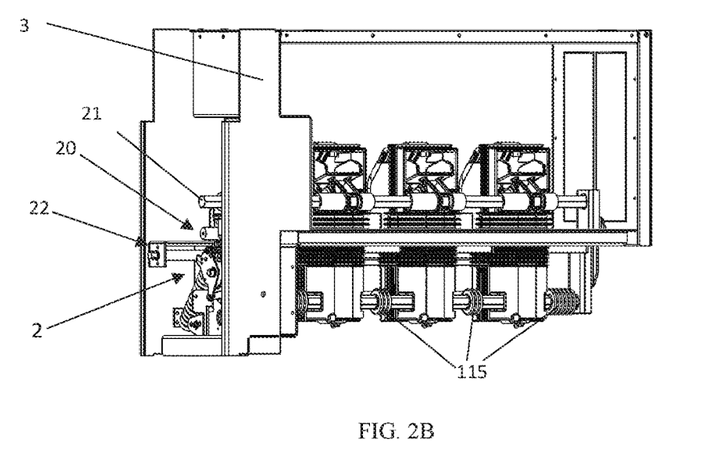
FIG. 2B is a schematic diagram of a switch in an isolated state.
Figure 2C:
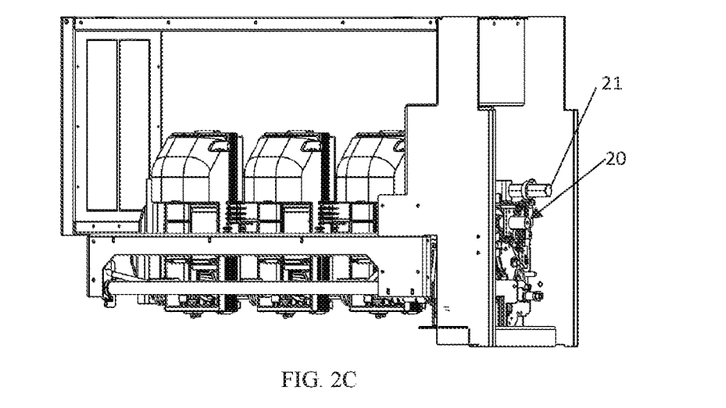
FIG. 2C is a schematic diagram of a switch in a grounded state.
Figure 3A:
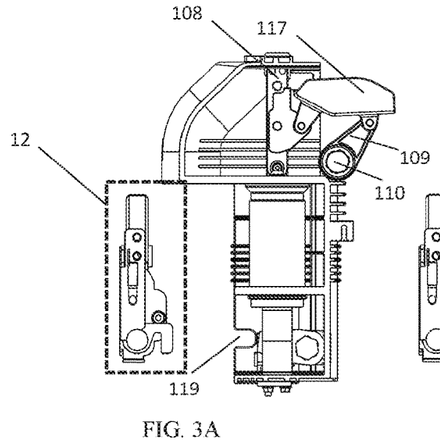
FIG. 3A is a schematic diagram of a switch in a close state.
Figures 3B, 3C:
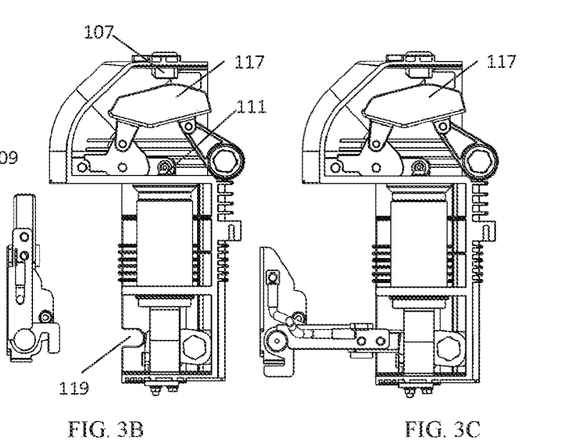
FIG. 3B is a schematic diagram of a switch in an isolated state.
FIG. 3C is a schematic diagram of a switch in a grounded state.

FIGS. 1A-1B are structural schematic diagrams of a gas-insulated vacuum load break switch of the present disclosure, in which FIG. 1A is a schematic diagram of an overall structure, and FIG. 1B is a structural schematic diagram of a high-voltage conductive loop part;

FIGS. 2A-2C are schematic diagrams of the gas-insulated vacuum load break switch of the present disclosure under different states, in which FIG. 2A is a schematic diagram of a switch in a close state, FIG. 2B is a schematic diagram of a switch in an isolated state, and FIG. 2C is a schematic diagram of a switch in a grounded state;

FIGS. 3A-3C are sectional schematic diagrams of a single-phase high-voltage conductive loop when the gas-insulated vacuum load break switch of the present disclosure is under different states, in which FIG. 3A is a schematic diagram of a switch in a close state, FIG. 3B is a schematic diagram of a switch in an isolated state, and FIG. 3C is a schematic diagram of a switch in a grounded state;

The gas-insulated vacuum load break switch of the present disclosure comprises a high-voltage conductive loop 1, a control operating mechanism 2, a support box 3 and a transmission apparatus 4. The high-voltage conductive loop 1 has three phases: the three phases of the high-voltage conductive loop 1 have the same structure and are independent from each other. Each phase of the high-voltage conductive loop 1 comprises a load break switch unit 10 with a vacuum interrupter, an isolating switch unit 11 with an isolator, a plastic housing 13 supporting the load break switch unit 10 and the isolating switch unit 11, and an earthing switch unit 12; the control operating mechanism 2 comprises a load break switch operating mechanism 20 for controlling the load break switch unit 10, an operating rod 21 controlling the isolating switch unit 11, and an earthing switch operating mechanism 22 for controlling the earthing switch unit 12; and a transmission apparatus 4 comprises a load break switch transmission apparatus 40 for the load break switch unit 10, an isolating switch transmission apparatus 41 for the isolating switch unit 11, and an earthing switch transmission apparatus 42 for the earthing switch unit 12.

The structure, performance and advantages of the gas-insulated vacuum load break switch of the present disclosure will be depicted below in detail in conjunction with the cases that the gas-insulated vacuum load break switch of the present disclosure is used as outgoing cabinet and incoming cabinet.

Figure 4A:
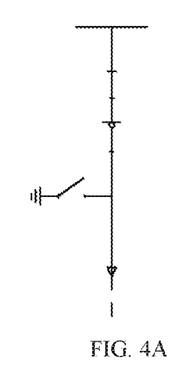
FIG. 4A illustrates a switch in a service state.
Figure 4B:
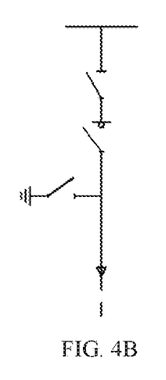
FIG. 4B illustrates a switch in an isolated state.
Figure 4C:
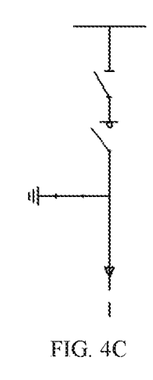
FIG. 4C illustrates a switch in a grounded state.

When the gas-insulated vacuum load break switch of the present disclosure is used as outgoing cabinet, it needs to have load break switch function, isolating switch function, and earthing switch function; the schematic diagrams of the single line diagram of the outgoing cabinet under various working states are shown in FIGS. 4A-4B, in which FIG. 4A is a single line diagram of the switchgear of the present disclosure in a service state, FIG. 4B is a single line diagram of the switchgear of the present disclosure in an isolated state, and FIG. 4C is a single line diagram of the switchgear of the present disclosure in a grounded state.

Figure 5A:
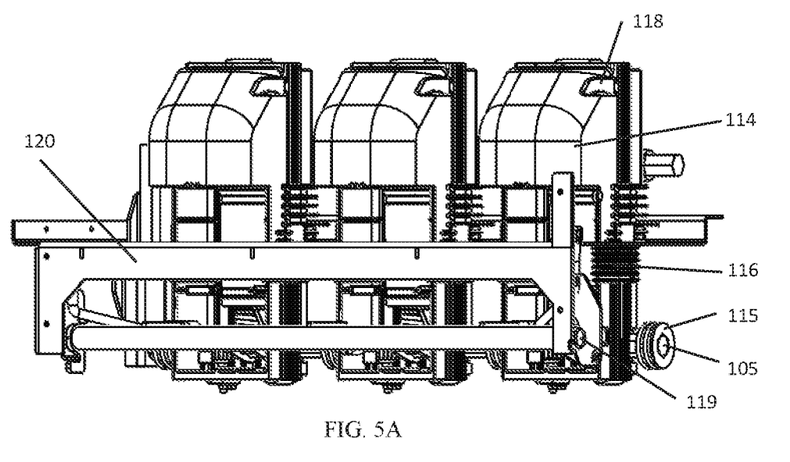
FIG. 5A is an installation schematic diagram of a high-voltage conductive loop placed on a support box.

When the vacuum load break switch utilizing the high-voltage conductive loop of the present disclosure is used as outgoing cabinet, it can meet the various working states required in the single line diagram of the outgoing cabinet. The working principle of the high-voltage conductive loop is as follows:

As shown in FIG. 5A, the high-voltage conductive loop comprises a load break switch unit, an isolating switch unit and a separate earthing switch unit with three phases integrated, in which:

A load break switch unit comprises a vacuum interrupter 101, a flexible band 102, a push-rod assembly 103, a push-rod driving crank arm 104, a load break switch driving spindle 105, a silicone sleeve 115 mounted on the load break switch driving spindle for increasing creepage distance between phases, and a cable connection terminal 106. An isolating switch unit comprises a busbar connection terminal 107, an isolator assembly 108, an isolator driving connection rod 117 integrating transmission and insulation, a driving crank arm 109 of the isolator, a driving spindle 110 of the isolating switch and a connection terminal 111 of the load break switch and the isolating switch. The earthing switch unit comprises an earthing switch stationary contact 112 and an earthing switch body 113. The main conductive components of the load break switch unit and the isolating switch unit are connected with a metal insert poured inside the plastic support housing 114 via bolts. The plastic support housing 114 is used for fixing and the three grounding switch stationary contacts 112 are connected with the cable connection terminal 106 poured inside the plastic support housing 114 via bolts. The plastic support housing 114 is mounted on the support case 120 via bolts to fix the overall high-voltage conductive loop. The earthing switch body 113 is mounted directly on the support case 120 via bolts. The plastic support housing 114 is provided with rib features 116 in different directions for increasing the creepage distance between charged objects and enhancing the mechanical strength of the plastic support housing 114. The plastic support housing is further provided with an isolating gap observation window 118 and an earthing fracture observation window 119 respectively.

In the prior art, the load break switch driving spindle is metallic and there must exist an insulator between the ground side and the high voltage side. In the present disclosure, the load break switch driving spindle 105 is an insulator, which is equivalent to converting the original insulator onto the spindle so that no additional insulator is needed between the push-rod and the spindle. In this way, the metal push-rod assembly can be very small. In addition, the load break switch driving spindle 105 is provided with a silicone sleeve 115 which can increase creepage distance between phases effectively.

Figure 5B:
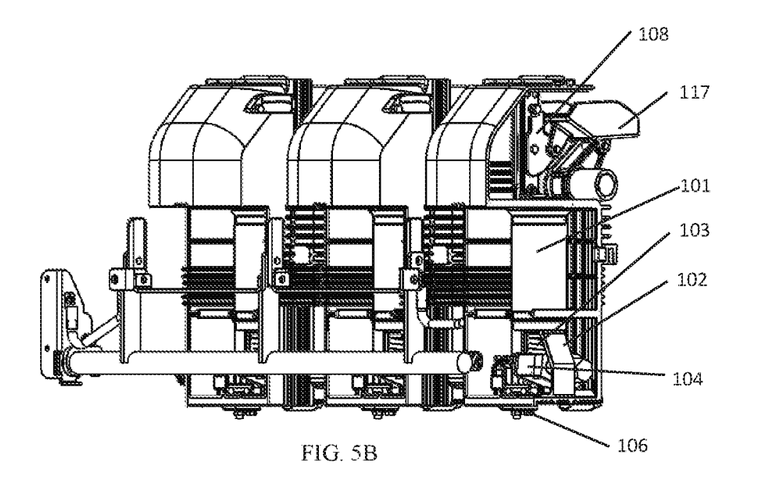
FIG. 5B is a schematic diagram of constituting structure of a three-phase high-voltage conductive loop in a close state.
Figure 5C:
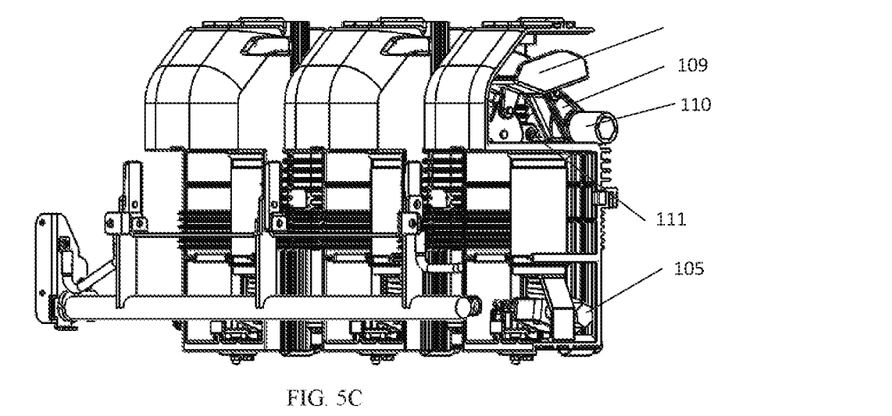
FIG. 5C is a schematic diagram of constituting structure of a three-phase high-voltage conductive loop in an isolated state.
Figure 5D:
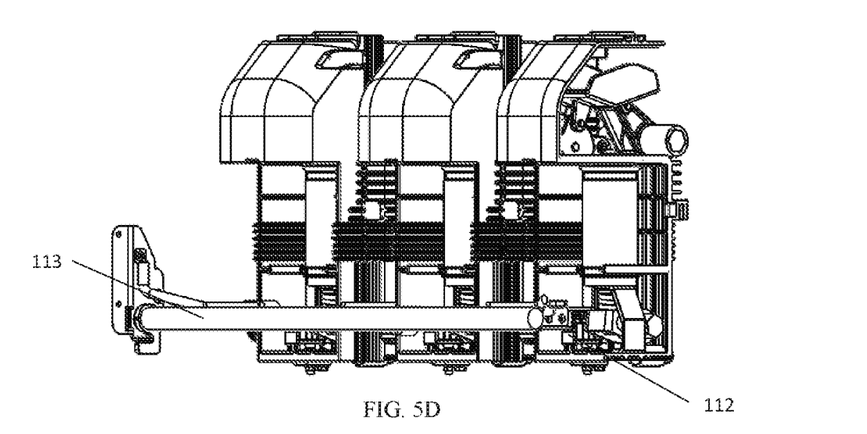
FIG. 5D is a schematic diagram of constituting structure of a three-phase high-voltage conductive loop in a grounded state.

By setting the isolator assembly 108 and the earthing switch body 113 of the high-voltage conductive loop in different positions, the present vacuum load break switch realizes the close state, isolated state and grounded state. The isolator assembly 108 is connected with the busbar connection terminal 107 and the connection terminal 111 of the load break switch and the isolating switch when in the vertical position as shown in FIG. 5B. The isolator driving connection rod 117 integrating transmission and insulation is located in a position as shown in FIG. 5B, achieving the function of fixing the isolator assembly 108. At the same time, the isolating switch unit is in the close state and the earthing switch unit is in an open state. When the load break switch unit is also in a closed state, the vacuum load break switch of the present disclosure is in the close state, meeting the functional requirement of the single line diagram of FIG. 4A. The isolator assembly 108 disengages from the busbar connection terminal 107 and forms an isolating gap of a certain distance when in the horizontal position as shown in FIG. 5C. The isolator driving connection rod 117 integrating transmission and insulation is located in a position as shown in FIG. 5C, achieving insulation function and reducing the direct distance between the high voltage side and the low voltage side. At the same time, the isolating switch unit is in the open state and the earthing switch unit is also in the open state. When the load break switch unit is also in the open state, the vacuum load break switch of the present disclosure is in the isolated state, meeting the functional requirement of the single line diagram of FIG. 4B. When the isolator assembly 108 is in the horizontal position as shown in FIG. 5D and the earthing switch body 113 is also in the horizontal position, the earthing switch body 113 is connected with the earthing switch stationary contact 112. At the same time, the isolating switch unit is in the open state and the earthing switch unit is in the closed state, the earthing switch stationary contact 112 grounds the cable side by connecting with the cable connection terminal 106, and the vacuum load break switch of the present disclosure is in the grounded state, meeting the functional requirement of the single line diagram of FIG. 4C.

Figures 6A, 6B:
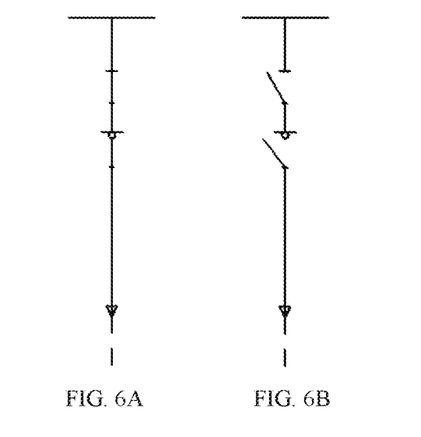
FIG. 6A illustrates a switch in a service state.
FIG. 6B illustrates a switch in an isolated state.

When the gas-insulated vacuum load break switch of the present disclosure is used as incoming cabinet, it needs to have load break switch function and isolating switch function and the grounding function is optional. In the following depiction, the incoming cabinet does not have the grounding function. If the customer chooses the grounding function, reference may be made to the depiction of the first preferred embodiment. The single line diagrams of the incoming cabinet without grounding function under various working states are shown in FIGS. 6A-6B, in which FIG. 6A is a single line diagram of the switchgear of the present disclosure in the operating state and FIG. 6B is a single line diagram of the switchgear of the present disclosure in the isolated state.

Figure 7A:
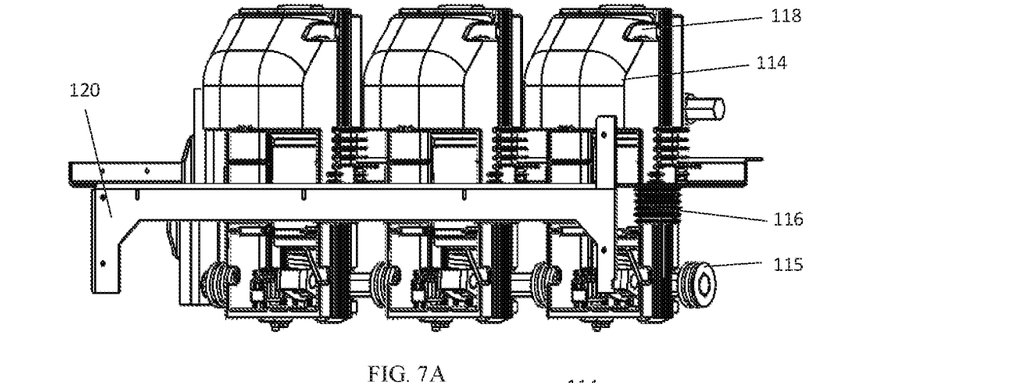
FIG. 7A is an installation schematic diagram of a high-voltage conductive loop placed on a support box.

When the vacuum load break switch utilizing the high-voltage conductive loop of the present disclosure is used as incoming cabinet, it can satisfy the various working states required in the single line diagram of the incoming cabinet. The working principle of the high-voltage conductive loop is as follows:

As shown in FIG. 7A, the high-voltage conductive loop comprises a load break switch and an isolating switch unit.

In the prior art, the load break switch driving spindle is metallic and there must exist an insulator between the ground side and the high voltage side. In the present disclosure, the load break switch driving spindle 105 is an insulator, which is equivalent to converting the original insulator onto the spindle so that no additional insulators are needed between the push-rod and the spindle. In this way, the metal push-rod assembly can be very small. In addition, the load break switch driving spindle 105 is provided with a silicone sleeve 115 which can increase creepage distance effectively.

Figure 7B:
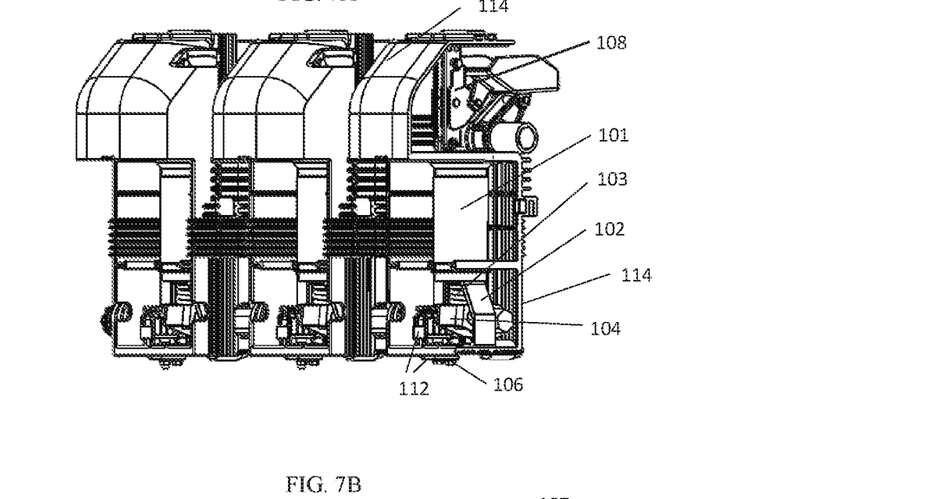
FIG. 7B is a schematic diagram of constituting structure of a three-phase high-voltage conductive loop in a close state.
Figure 7C:
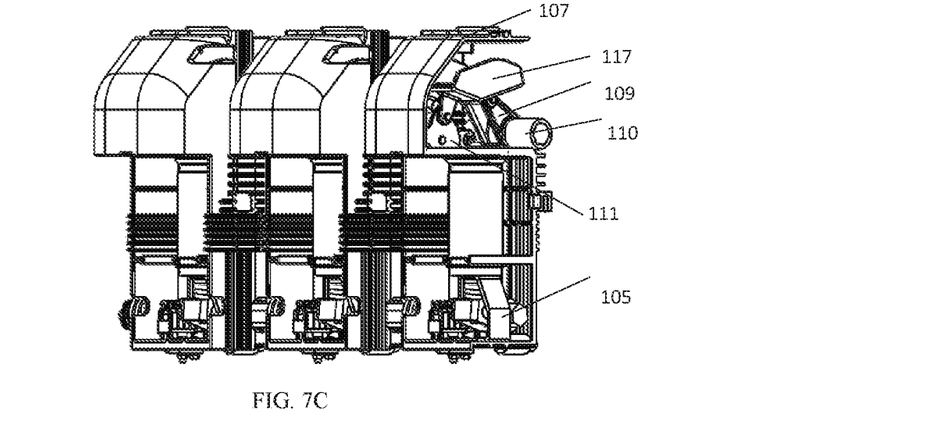
FIG. 7C is a schematic diagram of constituting structure of a three-phase high-voltage conductive loop in an isolated state.

By setting the isolator assembly 108 of the high-voltage conductive loop in different positions, the vacuum load break switch of the present disclosure realizes the close state and isolated state. The isolator assembly 108 is connected with the busbar connection terminal 107 and the connection terminal 111 of the load break switch and the isolating switch when in the vertical position as shown in FIG. 7B. The isolator driving connection rod 117 integrating transmission and insulation is located in a position as shown in FIG. 7B, achieving the function of fixing the isolator assembly 108. At the same time, the isolating switch unit is in the close state. When the load break switch unit is also in the closed state, the vacuum load break switch of the present disclosure is in the close state, meeting the functional requirement of the single line diagram of FIG. 6A. When the isolator assembly 108 is in the horizontal position as shown in FIG. 7C, the isolator assembly 108 disengages from the busbar connection terminal 107 and forms an isolating gap of a certain distance. The isolator driving connection rod 117 integrating transmission and insulation is located in a position shown in FIG. 7C, achieving insulation function and reducing the direct distance between the high voltage side and the low voltage side. At the same time, the isolating switch unit is in the open state. When the load break switch unit is also in the open state, the vacuum load break switch of the present disclosure is in the isolated state, meeting the functional requirement of the single line diagram of FIG. 6B.

Advantages of the high-voltage conductive loop of the present disclosure:

By means of reasonable layout of the load break switch unit, isolating switch unit and earthing switch unit and the ingenious design of the isolator driving connection rod integrating transmission and insulation, the high-voltage conductive loop meeting the functional requirement of the vacuum load break switch in the compact space of the original load break switch with sulfur hexafluoride as medium, thereby significantly reducing the spatial dimension of the load break switch without sulfur hexafluoride gas and saving both costs and occupancy space of the device.

Although preferred embodiments and drawings of the present disclosure are disclosed for purpose of illustration, it is known to those skilled in the art that various alterations, variations and refinements are possible without departing from the spirits and scope of the present disclosure and the appended claims. Therefore, the present disclosure is not limited to the content disclosed by the preferred embodiments and drawings, and the scope of protection of the present disclosure is defined by the scope limited by the appended claims.

We claim:

1. A gas-insulated vacuum load break switch, comprising: a conductive line, a control operating mechanism, a support box and a transmission apparatus, wherein
   the conductive line has three phases, the three phases of the conductive line being of a same structure and independent from each other;
   each phase of the conductive line comprises a load break switch unit with a vacuum interrupter, an isolating switch unit with an isolator, a plastic housing supporting the load break switch unit and the isolating switch unit, and an earthing switch unit;
   the control operating mechanism comprises a load break switch operating mechanism for controlling the load break switch unit, an operating rod for controlling the isolating switch unit, and an earthing switch operating mechanism for controlling the earthing switch unit; and
   the transmission apparatus comprises a load break switch transmission apparatus for the load break switch unit, an isolating switch transmission apparatus for the isolating switch unit, and an earthing switch transmission apparatus for the earthing switch unit.

2. The gas-insulated vacuum load break switch of claim 1, wherein the isolating switch unit comprises a busbar connection terminal, an isolator assembly, an isolator driving connection rod integrating transmission and insulation, a driving crank arm of the isolator, a driving spindle of the isolating switch and a connection terminal of the load break switch and the isolating switch.

3. The gas-insulated vacuum load break switch of claim 2, wherein the isolator assembly disengages from the busbar connection terminal and forms an isolating gap when in a horizontal position, and the isolator driving connection rod integrating transmission and insulation is used for insulation and increases a creeping distance between a first side and a second side relative to an arrangement that lacks the isolator driving connection rod.

4. The gas-insulated vacuum load break switch of claim 2, wherein the isolator assembly connects the busbar connection terminal and the connection terminal of the load break switch and the isolating switch when in a vertical position, the isolator driving connection rod integrating transmission and insulation is used for fixing the isolator assembly and at the same time the isolating switch unit is in a close state.

5. The gas-insulated vacuum load break switch of claim 1, wherein the load break switch unit comprises a vacuum interrupter, a flexible band, a push-rod assembly, a push-rod driving crank arm, a load break switch driving spindle and a cable connection terminal.

6. The gas-insulated vacuum load break switch of claim 5, wherein the load break switch driving spindle is an insulator.

7. The gas-insulated vacuum load break switch of claim 6, wherein the load break switch unit further comprises a silicone sleeve cladded on the load break switch driving spindle for increasing a creepage distance between phases.

8. The gas-insulated vacuum load break switch of claim 1, wherein the earthing switch unit comprises an earthing switch stationary contact and an earthing switch body, and the earthing switch stationary contact is connected with a cable connection terminal poured inside the plastic support housing; and the plastic support housing is mounted on a support case to fix the overall conductive line.

* * * * *